United States Patent
Landick

(10) Patent No.: US 10,841,704 B2
(45) Date of Patent: Nov. 17, 2020

(54) DISTRIBUTED MODE LOUDSPEAKER ELECTROMAGNETIC ACTUATOR WITH AXIALLY AND RADIALLY MAGNETIZED CIRCUIT

(71) Applicant: Google LLC, Mountain View, CA (US)

(72) Inventor: Graham Robert Landick, Coveney (GB)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/289,162

(22) Filed: Feb. 28, 2019

(65) Prior Publication Data

US 2019/0313194 A1 Oct. 10, 2019

Related U.S. Application Data

(60) Provisional application No. 62/654,173, filed on Apr. 6, 2018.

(51) Int. Cl.
*H04R 7/04* (2006.01)
*G06F 1/16* (2006.01)
(Continued)

(52) U.S. Cl.
CPC ........... *H04R 7/045* (2013.01); *G06F 1/1626* (2013.01); *G06F 1/1637* (2013.01);
(Continued)

(58) Field of Classification Search
CPC .... G06F 1/1626; G06F 1/1637; G06F 1/1684; G06F 1/1688; G06F 3/016; H04R 1/2803; H04R 7/04; H04R 7/045; H04R 9/025; H04R 9/06; H04R 2499/11; H04R 2499/15

See application file for complete search history.

(56) References Cited

U.S. PATENT DOCUMENTS

| | | |
|---|---|---|
| 4,506,117 A | 3/1985 | Fresard |
| 4,675,907 A | 6/1987 | Itagaki et al. |

(Continued)

FOREIGN PATENT DOCUMENTS

| | | |
|---|---|---|
| CN | 204305346 | 4/2015 |
| CN | 204334939 | 5/2015 |

(Continued)

OTHER PUBLICATIONS

PCT International Search Report and Written Opinion in International Appln. PCT/GB2019/051008, dated Jun. 11, 2019, 16 pages.

(Continued)

*Primary Examiner* — Brian Ensey

(57) ABSTRACT

An electromagnetic actuator includes an inner magnet arranged relative to an axis, an outer magnet arranged a radial distance from the axis, an inner radial wall of the outer magnet facing an outer radial wall of the inner magnet, the inner and outer radial walls being separated by an air gap, a voice coil arranged in the air gap separating the inner and outer magnets, and an actuator coupling plate attached to the voice coil. The inner magnet is axially magnetized and the outer magnet is radially magnetized. During operation of the device electrical activation of the voice coil causes axial motion of the actuator coupling plate.

13 Claims, 4 Drawing Sheets

(51) Int. Cl.
| | | |
|---|---|---|
| *H04R 9/06* | (2006.01) | |
| *H04R 1/28* | (2006.01) | |
| *H04R 9/02* | (2006.01) | |
| *G06F 3/01* | (2006.01) | |

(52) U.S. Cl.
CPC .......... *G06F 1/1684* (2013.01); *G06F 1/1688* (2013.01); *G06F 3/016* (2013.01); *H04R 1/2803* (2013.01); *H04R 7/04* (2013.01); *H04R 9/025* (2013.01); *H04R 9/06* (2013.01); *H04R 2499/11* (2013.01); *H04R 2499/15* (2013.01)

(56) References Cited

U.S. PATENT DOCUMENTS

| | | | |
|---|---|---|---|
| 5,452,366 A * | 9/1995 | Sakamoto | H04R 9/025 381/396 |
| 5,729,617 A | 3/1998 | Gruber | |
| 6,494,289 B1 | 12/2002 | Bachmann et al. | |
| 6,611,606 B2 * | 8/2003 | Guenther | H04R 9/02 381/412 |
| 6,618,487 B1 | 9/2003 | Azima et al. | |
| 6,965,679 B1 | 11/2005 | Lopez Bosio et al. | |
| 7,889,876 B2 | 2/2011 | Hynd et al. | |
| 8,204,266 B2 * | 6/2012 | Frigola Munoz | H04R 7/045 181/145 |
| 8,494,208 B2 | 7/2013 | Fordham | |
| 9,515,541 B2 | 12/2016 | Tang et al. | |
| 9,818,805 B2 | 11/2017 | Choi et al. | |
| 2003/0147541 A1 | 8/2003 | Bachmann et al. | |
| 2008/0101649 A1 | 5/2008 | Kosuda et al. | |
| 2009/0184589 A1 | 7/2009 | Yamagishi | |
| 2009/0316943 A1 | 12/2009 | Frigola Munoz et al. | |
| 2010/0172534 A1 | 7/2010 | Lemarquand et al. | |
| 2014/0056468 A1 | 2/2014 | Kuze et al. | |
| 2014/0146024 A1 | 5/2014 | Kamada et al. | |
| 2015/0010175 A1 | 1/2015 | Porter et al. | |
| 2015/0195630 A1 | 7/2015 | Yliaho et al. | |
| 2015/0341901 A1 | 11/2015 | Ryu et al. | |
| 2016/0323674 A1 | 11/2016 | Porter et al. | |
| 2016/0378071 A1 | 12/2016 | Rothkopf | |
| 2017/0070811 A1 | 3/2017 | Michelich et al. | |
| 2017/0280234 A1 | 9/2017 | Choi et al. | |
| 2017/0280243 A1 | 9/2017 | Choi et al. | |
| 2019/0261092 A1 | 8/2019 | Landick | |

FOREIGN PATENT DOCUMENTS

| | | |
|---|---|---|
| CN | 205545918 U | 8/2016 |
| EP | 1084592 | 10/2003 |
| EP | 2512154 A1 | 10/2012 |
| WO | 9709842 A2 | 3/1997 |
| WO | WO2011/051722 | 5/2011 |

OTHER PUBLICATIONS

International Search Report and Written Opinion dated May 9, 2020 for International Application No. PCT/GB2019/05044, 15 pages.

English Translation of Taiwanese Office Action dated Apr. 9, 2020 for TW Application No. 108105399, 5 pages.

Final Office Action dated Jul. 25, 2019 for U.S. Appl. No. 15/972,065, 16 pages.

Non-Final Office Action dated Apr. 2, 2019 for U.S. Appl. No. 15/972,065, 19 pages.

Non-Final Office Action dated Mar. 3, 2020 for U.S. Appl. No. 15/972,065, 15 pages.

English Translation of Taiwanese Office Action dated Apr. 27, 2020 for TW Application No. 108111644, 5 pages.

Notice of Allowance dated Jul. 24, 2020 for U.S. Appl. No. 15/972,065, 9 pages.

\* cited by examiner

DISTRIBUTED MODE LOUDSPEAKER ELECTROMAGNETIC ACTUATOR WITH AXIALLY AND RADIALLY MAGNETIZED CIRCUIT

CROSS-REFERENCE TO RELATED APPLICATIONS

This application claims priority to U.S. Application Ser. No. 62/654,173, filed on Apr. 6, 2018, entitled "DISTRIBUTED MODE LOUDSPEAKER ELECTROMAGNETIC ACTUATOR WITH AXIALLY & RADIALLY MAGNETIZED CIRCUIT," the entire contents of which is incorporated herein by reference.

FIELD

This disclosure relates generally to audio transducers, particularly, to the design of a low mass, miniature, high power audio transducer.

BACKGROUND

Many conventional loudspeakers produce sound by inducing piston-like motion in a diaphragm. Panel audio loudspeakers, such as distributed mode loudspeakers (DMLs), in contrast, operate by inducing uniformly distributed vibration modes in a panel through an electro-acoustic actuator. Typically, the actuators are electromagnetic or piezoelectric actuators.

Conventional panel audio loudspeaker magnet systems can have performance limitations arising from the soft magnetic material increasing inductance and electrical impedance with increasing frequency. This increase in electrical inductance can have drawbacks, including a reduction in the acoustic output at high frequency.

The temperature and electrical resistance of a voice coil conductor also tends to increase with increasing current which can cause power compression and limit the maximum force generated by the actuator. It may therefore be necessary to maximize the efficiency of the force generated by the actuator.

When the package size of an actuator is limited, the use of a thin magnet disc is often used in conjunction with a ferrous cup and pole piece, such as in the actuator shown in cross-section in FIG. 1. Here, an actuator 100 is shown in cross-section and includes a permanent magnet 120 shaped as a thin disc and a voice coil 140. Voice coil 140 includes voice coil windings 145 wound around a tube connected to an actuator coupling plate 150 which, when fully assembled, is attached to a panel of the panel audio loudspeaker. The magnet 120 is housed in a soft magnetic cup 110 (e.g., a ferrous cup), and is sandwiched between a base 111 of magnetic cup 110 and a soft magnetic top plate 130, or pole piece. Magnetic cup 110 is attached, via spring elements, to a frame (not shown), which can be attached to actuator coupling plate 150, suspects the magnetic cup, magnet 120 and top plate 130 relative to voice coil 140. An air gap 160 exists between side walls 112 of magnetic cup 110 and magnet 120 and top plate 130. Voice coil 140 is positioned in the air gap.

Magnet 120 is axially magnetized. In other words, the poles of the permanent magnet are aligned along the axial direction. When the voice coil is energized, it generates a magnetic field that interacts with the field of the permanent magnet, axially displacing the magnetic cup, magnet, and top plate relative to the voice coil.

The topology of actuator 100 can be limited in its force generation due to the reduced flux density experienced at the outer face of the air gap compared to the flux density experienced at the inner face of the air gap created by the pole piece. This reduces the total flux density present in the air gap which corresponds to a reduction in force output.

SUMMARY

In general, in one aspect, the disclosure features a device including an inner magnet arranged relative to an axis, an outer magnet arranged a radial distance from the axis, an inner radial wall of the outer magnet facing an outer radial wall of the inner magnet, the inner and outer radial walls being separated by an air gap, a voice coil arranged in the air gap separating the inner and outer magnets, and an actuator coupling plate attached to the voice coil. The inner magnet is axially magnetized and the outer magnet is radially magnetized. During operation of the device electrical activation of the voice coil causes axial motion of the actuator coupling plate.

Implementations of the device can include one or more of the following features. For example, the inner and outer magnets can be symmetric with respect to axial rotations.

The device can include a soft magnetic material attached to the inner and outer magnets. For example, the device can include plates on opposing sides of the inner and outer magnets in the axial direction comprising the soft magnetic material. In some embodiments, the device includes a yoke composed of the soft magnetic material.

The device can have a maximum dimension in the axial direction of 10 mm or less (e.g., 8 mm or less, 5 mm or less, 4 mm or less, 3 mm or less).

In a further aspect, the disclosure features a panel audio loudspeaker, including the device and a panel mechanically attached to the actuator coupling plate. The panel can include a display panel (e.g., an OLED or LCD display panel). The panel can include a touch panel. The device can be configured to generate audio and/or haptic responses.

In a further aspect, the disclosure features a mobile device including the panel audio loudspeaker. The mobile device can be a mobile phone or a tablet computer. In some embodiments, the mobile device is a wearable device.

Among other advantages, the disclosure features panel audio loudspeakers that fit within a limited physical space and provide sufficient force over a prescribed audio bandwidth and excites vibrational modes within a diaphragm and comprise of a sufficiently small package size. For example, panel audio loudspeaker systems include an actuator with sufficient efficiency of force output with respect to electrical input within a miniature package size for applications that have limited space for the location of such an actuator. Said actuators may be designed to specify the actuator/diaphragm fundamental resonance frequency at a bandwidth optimized to provide haptic feedback and a constant force bandwidth.

This technology applies to panel audio systems designed to provide acoustic and/or haptic feedback. The panel may be a display system, for example based on OLED technology. The panel may be part of a smartphone or wearable devices.

Other advantages will be evidence from the description, drawings, and claims.

DETAILED DESCRIPTION

In general, the disclosure features electromagnetic transducers that combine an axially magnetized magnet within an annular radially magnetized wall. It is believed that such transducers can produce more power per physical size and mass than conventional transducers. This increased power is believed to be made possible by combining, for example, both a thin, flat axially magnetized neodymium magnet and a thin wall radially magnetized magnet(s).

Figure 1:
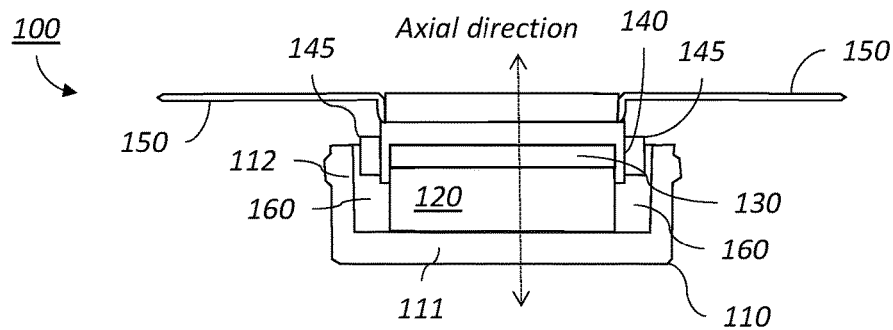
FIG. 1 is a cross-sectional view of an embodiment of a circuit actuator suitable for a distributed mode loudspeaker (DML).
Figure 2:
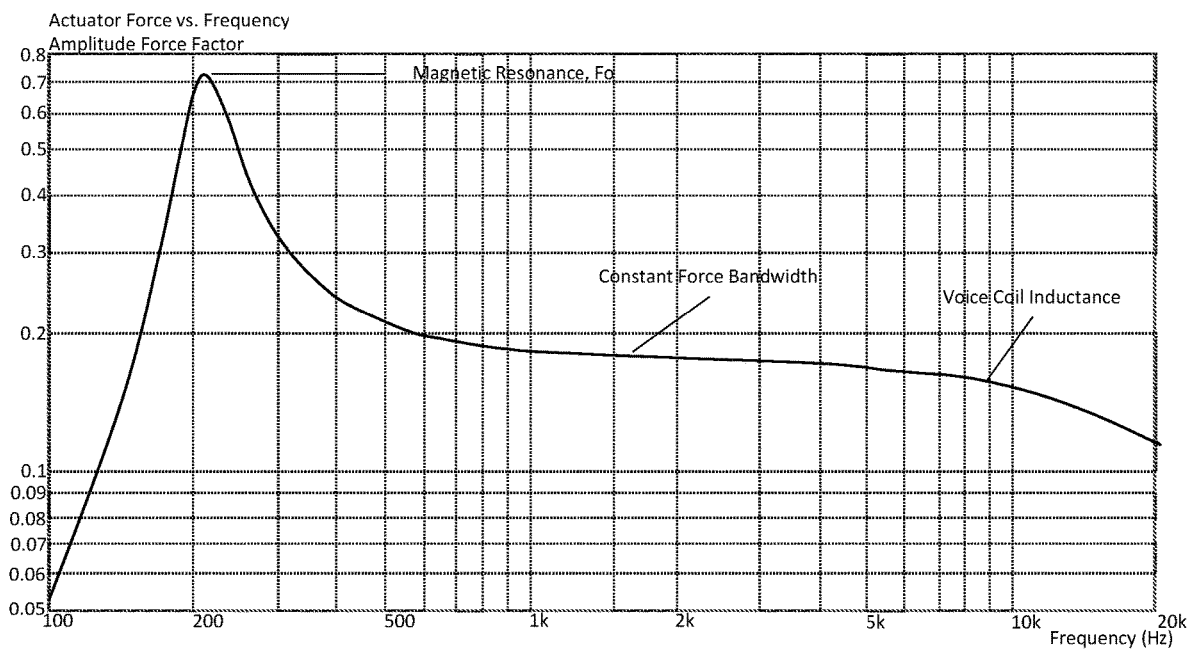
FIG. 2 is a plot showing a characteristic actuator force as a function of frequency.

Such an actuator can have a characteristic force vs frequency behavior as shown in FIG. 2. Here, the vertical axis shows a force factor, while the horizontal axis shows frequency from 100 Hz to 20 kHz. Both axes are shown with logarithmic scales. The actuator force peaks at a resonance frequency, $F_0$, in this case at about 200 Hz. At higher frequencies, e.g., 500 Hz to 5 kHz in the example shown, the force v. frequency response is relatively constant. At higher frequencies (e.g., 10 kHz to 20 kHz), the force factor monotonically decreases as the voice coil inductance increasingly influences the response.

Figure 3:
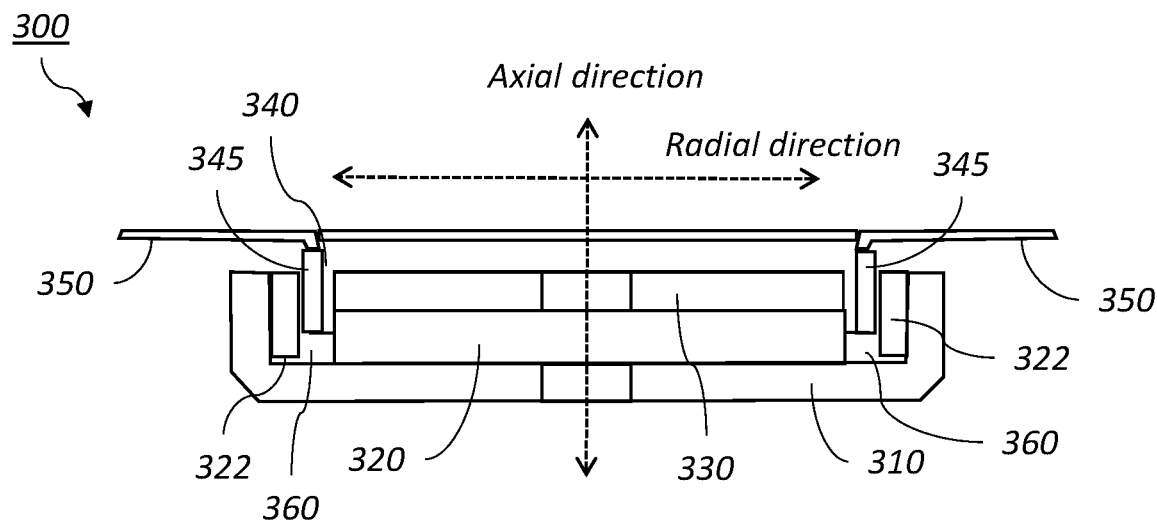
FIG. 3 is a cross-sectional view of another embodiment of a DML circuit actuator.

FIG. 3 depicts an example of such an actuator in cross-section. Specifically, FIG. 3 depicts a round, axisymmetric panel audio loudspeaker actuator 300 using both an axially magnetized disc magnet 320, a radially magnetized cylindrical magnet 322 and a voice-coil 340 with windings 345 located in a magnetic air gap 360 between a soft magnetic top plate 330 and a soft magnetic cup 310. As noted above, axial magnetization means that magnet 320 has its magnetic poles aligned in the axial direction, as depicted in FIG. 3. Radial magnetization means that the magnetic poles of magnet 322 are aligned in the radial direction, which is perpendicular to the axial direction. In the radial direction, air gap 360 is located between magnet 320 and magnet 322. Voice coil 340 connects actuator 300 to a coupling plate 350 to generate a constant force to a diaphragm (plate, not shown in FIG. 3) in order to excite multiple vibrational modes of said diaphragm to generate acoustic output.

In general, the magnets can be formed from a material than can be permanently magnetized, such as rare earth magnet materials. Exemplary materials include neodymium iron boron, samarium cobalt, barium ferrite, and strontium ferrite.

The soft magnetic plate and cup can be formed from a material or materials that are readily magnetized in the presence of an external magnetic field and demagnetized when the external field is removed. Typically, such materials have high magnetic permeability. Examples include high carbon steel and vanadium permendur. Accordingly, the soft magnetic plate and yoke serve to guide the magnetic flux lines from the axially magnetized magnets across the air gap.

It is believed that the use of both an axially magnetized and radially magnetized magnets provides means of maximizing and balancing the flux density experienced at both the inner and outer faces of the soft magnetic top plate and yoke maximizing the total flux density present in the air gap and therefore maximizing the force output.

Generally, radially magnetized magnet 322 can be formed from one or more segments. For example, this magnet can be realized by arc segments of a magnetic material constructed in such a way to create a continuous cylinder.

It is believed that the use of a complementary radially magnetized magnet surrounding the outside of the voice coil and contained by a soft magnetic yoke/cup contains the magnetic flux within the structure of the magnetic motor circuit reducing (e.g., minimizing) leakage of magnetic flux from the magnetic circuit thereby reducing (e.g., minimizing) interactance of the electromagnetic field with other sensitive components that may be in close proximity to the electromagnetic actuator. Additionally, the extended vertical length of the radially magnetized magnet can provide a consistent field strength over the full length of the mechanical excursion capability of the voice coil.

The actuator shown in FIG. 3 can be compact. For example, the thickness of the actuator in the axial direction can be on the order of a few mm, e.g., 5 mm or less, 4 mm or less, 3 mm or less, 2 mm or less. The lateral dimensions can also be relatively small. For example, the outer axially magnetized magnet can have a lateral diameter (i.e., the diameter orthogonal to the symmetry axis) of 20 mm or less (e.g., 15 mm or less, 12 mm or less, 10 mm or less, 8 mm or less, 7 mm or less, 6 mm or less, 5 mm or less).

Figure 4:
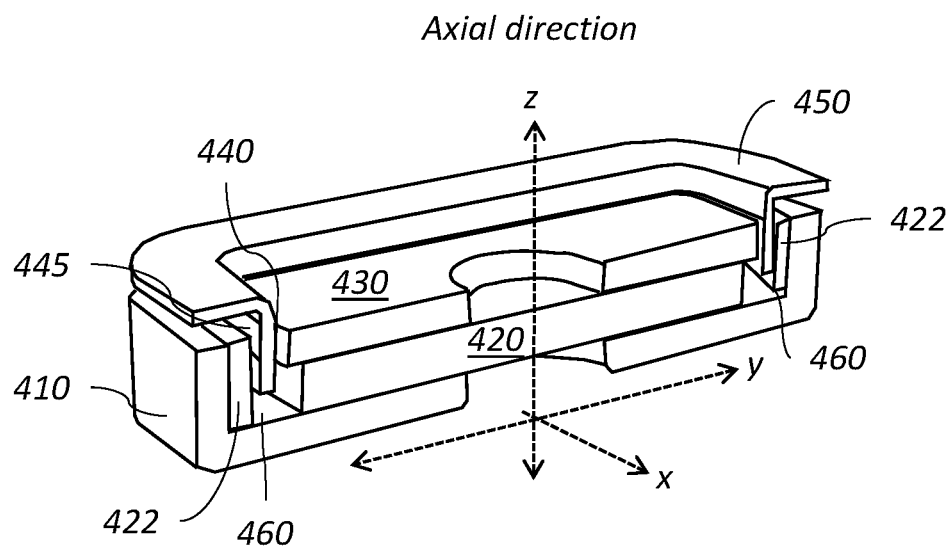
FIG. 4 is a sectional perspective view of a further embodiment of a DML circuit actuator.

In addition to a round, axisymmetric embodiment of this magnetic circuit design, it is also feasible to realize the magnetic circuit topology within an elongated (e.g., oblong) package as shown in FIG. 4. Here, an actuator 400 includes a voice coil 440 connected to an actuator coupling plate 450. Voice coil 440 supports windings 445 which are arranged in an air gap 460 between an inner magnet 420 and an outer magnet 422. Inner magnet 420 is sandwiched between a soft magnetic top plate 430 and a soft magnetic cup (yoke) 410. Inner magnet 420 is axially magnetized and outer magnet 422 is radially magnetized.

Inner magnet 420 is shaped to be concentrically slightly smaller than soft magnetic top plate 430. In other words, top plate 430 extends slightly further in the x and y directions than magnet 420. Top plate 430 is also shaped to be concentrically slightly smaller than the voice coil 440. Radially magnetized outer magnet 422 can be constructed of linear magnetic blocks situated along the outer, linear sides of the voice coil.

Generally, the actuators described can generate haptic output in addition to acoustic output. For instance, the actuators can provide output below 200 Hz.

Figure 5A:
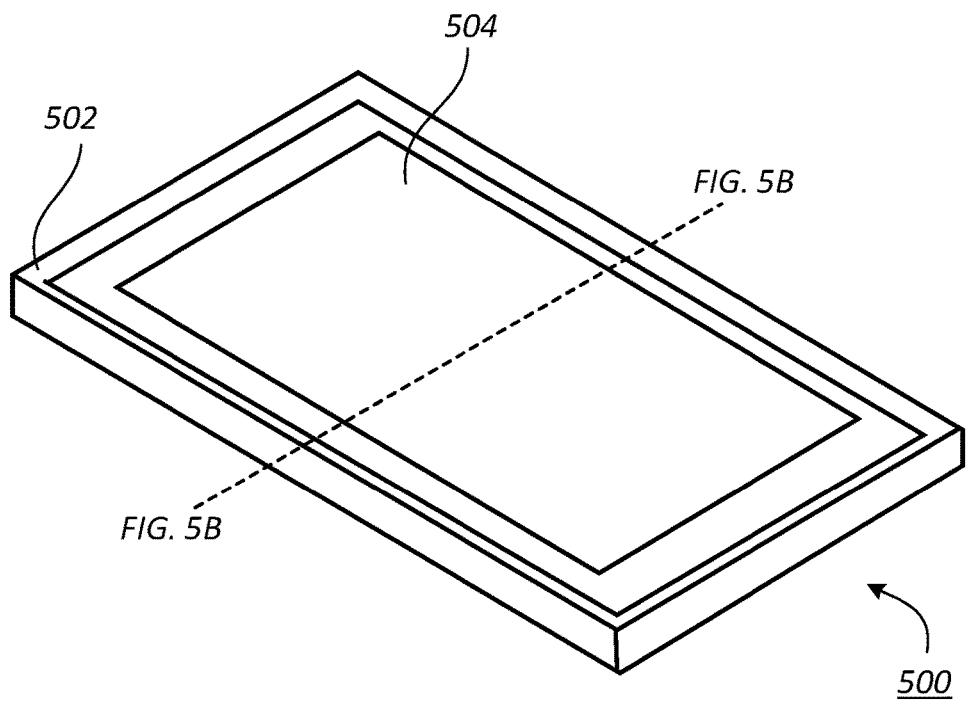
FIGS. 5A and 5B show an embodiment of a mobile device that includes a panel audio loudspeaker with an actuator.

The actuator technology disclosed herein can be used in panel audio systems, e.g., designed to provide acoustic and/or haptic feedback. The panel may be a display system, for example based on OLED or LCD technology. The panel may be part of a smartphone, tablet computer, or wearable devices (e.g., smartwatch or head-mounted device, such as smart glasses). For example, referring to FIG. 5A, a mobile device 500 includes a device chassis 502 and a touch panel display 504 including a flat panel display (e.g., an OLED or LCD display panel) that integrates a panel audio loudspeaker. Mobile device (e.g., a smartphone) 500 interfaces with a user in a variety of ways, including by displaying images, receiving touch input via a touch panel display 504, and producing audio and haptic output. Generally, as part of a panel audio loudspeaker, the vibrating panel generates human-audible sound waves, e.g., in the range of 20 Hz to 20 kHz. In addition to producing sound output, mobile device 500 also produces haptic output via display panel 504. For example, the haptic output can correspond to vibrations in the range of 180 Hz to 300 Hz.

Typically, a mobile device has a depth of approximately 10 mm or less, a width of 60 mm to 80 mm (e.g., 68 mm to 72 mm), and a height of 100 mm to 160 mm (e.g., 138 mm to 144 mm). Accordingly, compact and efficient actuators for driving panel 504, such as those described above, are desirable.

Figure 5B:
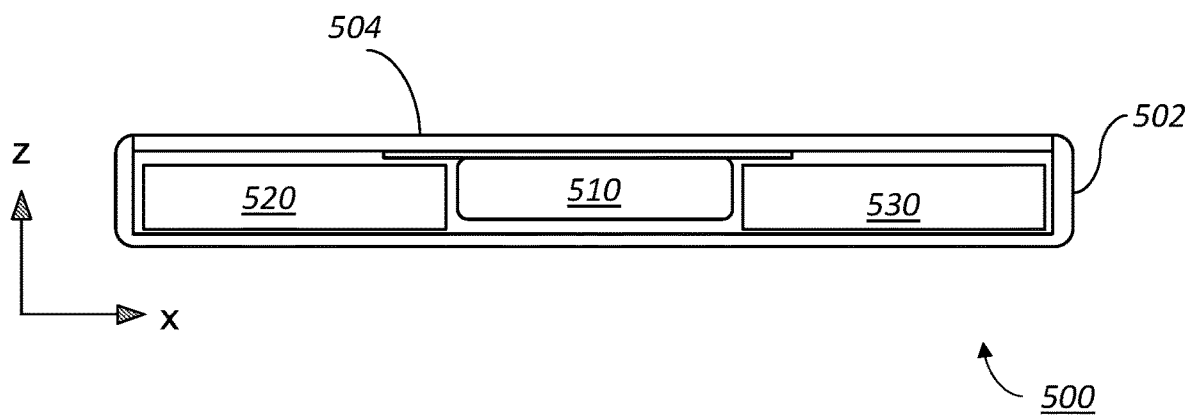

Referring to FIG. 5B, which shows a cross-section through mobile device 500, together device chassis 502 and display panel 504 form an enclosure for housing components of mobile device 500 such as an actuator 510, a battery 530 and an electronic control module 520.

Actuator 510 can be one of the actuators described above (e.g., actuator 300 or 400) and is sized to fit within a volume constrained by other components housed in mobile device 500, including electronic control module 520 and battery 530. Electronic control module 220 provides control signals to actuator 510, causing it to produce audio and/or haptic output.

Figure 6:
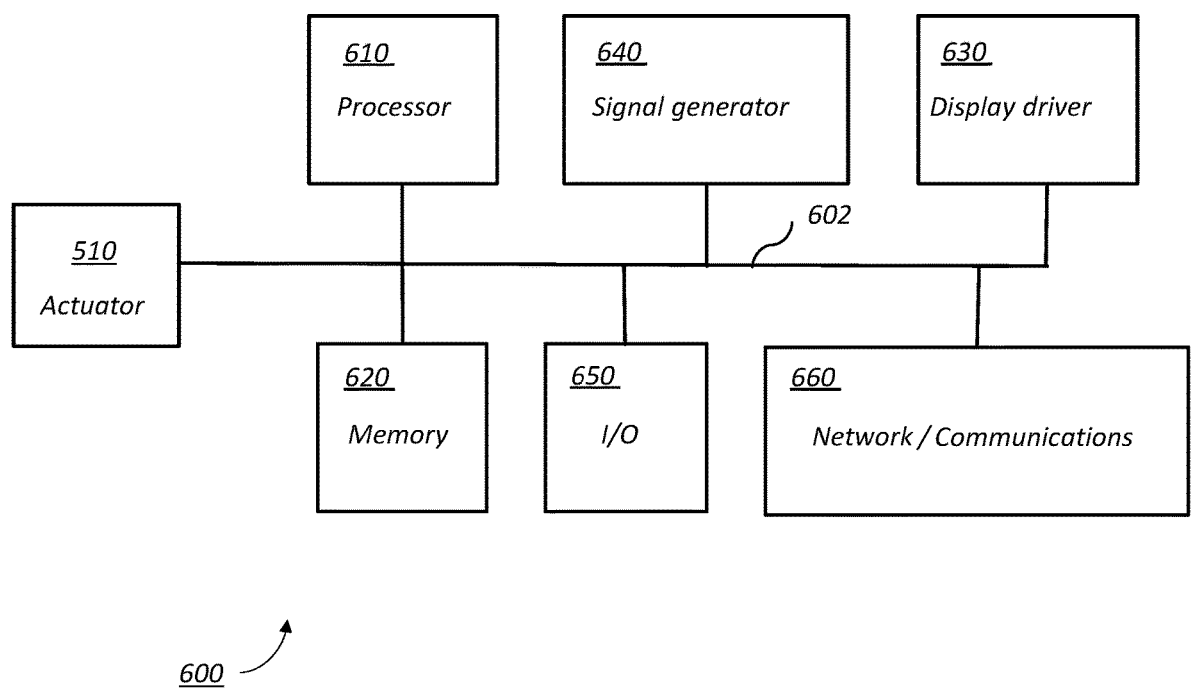
FIG. 6 is a schematic diagram of an embodiment of an electronic control module for providing drive signals to an actuator.

In general, electronic control modules are composed of one or more electronic components that receive input from one or more sensors and/or signal receivers of the mobile phone, process the input, and generate and deliver signal waveforms that cause actuator 510 to provide a suitable haptic response. Referring to FIG. 6, an exemplary electronic control module 600 of a mobile device, such as mobile phone 500, includes a processor 610, memory 620, a display driver 630, a signal generator 640, an input/output (I/O) module 650, and a network/communications module 660. These components are in electrical communication with one another (e.g., via a signal bus 602) and with actuator 510.

Processor 610 may be implemented as any electronic device capable of processing, receiving, or transmitting data or instructions. For example, processor 610 can be a microprocessor, a central processing unit (CPU), an application-specific integrated circuit (ASIC), a digital signal processor (DSP), or combinations of such devices.

Memory 620 has various instructions, computer programs or other data stored thereon. The instructions or computer programs may be configured to perform one or more of the operations or functions described with respect to the mobile device. For example, the instructions may be configured to control or coordinate the operation of the device's display via display driver 630, signal generator 640, one or more components of I/O module 650, one or more communication channels accessible via network/communications module 660, one or more sensors (e.g., biometric sensors, temperature sensors, accelerometers, optical sensors, barometric sensors, moisture sensors and so on), and/or actuator 510.

Signal generator 640 is configured to produce AC waveforms of varying amplitudes, frequency, and/or pulse profiles suitable for actuator 510 and producing acoustic and/or haptic responses via the actuator. Although depicted as a separate component, in some embodiments, signal generator 640 can be part of processor 610. In some embodiments, signal generator 640 can include an amplifier, e.g., as an integral or separate component thereof.

Memory 620 can store electronic data that can be used by the mobile device. For example, memory 620 can store electrical data or content such as, for example, audio and video files, documents and applications, device settings and user preferences, timing and control signals or data for the various modules, data structures or databases, and so on. Memory 620 may also store instructions for recreating the various types of waveforms that may be used by signal generator 640 to generate signals for actuator 510. Memory 620 may be any type of memory such as, for example, random access memory, read-only memory, Flash memory, removable memory, or other types of storage elements, or combinations of such devices.

As briefly discussed above, electronic control module 600 may include various input and output components represented in FIG. 6 as I/O module 650. Although the components of I/O module 650 are represented as a single item in FIG. 6, the mobile device may include a number of different input components, including buttons, microphones, switches, and dials for accepting user input. In some embodiments, the components of I/O module 650 may include one or more touch sensor and/or force sensors. For example, the mobile device's display may include one or more touch sensors and/or one or more force sensors that enable a user to provide input to the mobile device.

Each of the components of I/O module 650 may include specialized circuitry for generating signals or data. In some cases, the components may produce or provide feedback for application-specific input that corresponds to a prompt or user interface object presented on the display.

As noted above, network/communications module 660 includes one or more communication channels. These communication channels can include one or more wireless interfaces that provide communications between processor 610 and an external device or other electronic device. In general, the communication channels may be configured to transmit and receive data and/or signals that may be interpreted by instructions executed on processor 810. In some cases, the external device is part of an external communication network that is configured to exchange data with other devices. Generally, the wireless interface may include, without limitation, radio frequency, optical, acoustic, and/or magnetic signals and may be configured to operate over a wireless interface or protocol. Example wireless interfaces include radio frequency cellular interfaces, fiber optic interfaces, acoustic interfaces, Bluetooth interfaces, Near Field Communication interfaces, infrared interfaces, USB interfaces, Wi-Fi interfaces, TCP/IP interfaces, network communications interfaces, or any conventional communication interfaces.

In some implementations, one or more of the communication channels of network/communications module 660 may include a wireless communication channel between the mobile device and another device, such as another mobile phone, tablet, computer, or the like. In some cases, output, audio output, haptic output or visual display elements may be transmitted directly to the other device for output. For example, an audible alert or visual warning may be transmitted from the electronic device 600 to a mobile phone for output on that device and vice versa. Similarly, the network/communications module 660 may be configured to receive input provided on another device to control the mobile device. For example, an audible alert, visual notification, or haptic alert (or instructions therefore) may be transmitted from the external device to the mobile device for presentation.

A number of embodiments are disclosed. Other embodiments are in the following claims.

What is claimed is:

1. A device, comprising:
a panel comprising a display; and
an actuator, comprising:
an inner magnet arranged relative to an axis;
an outer magnet arranged a radial distance from the axis, an inner radial wall of the outer magnet facing an outer radial wall of the inner magnet, the inner and outer radial walls being separated by an air gap;
a cup comprising a base and a side defining a cup cavity, the base and side comprising a soft magnetic material, the inner and outer magnets being arranged in the cup cavity;
a voice coil arranged in the air gap separating the inner and outer magnets;
an actuator coupling plate attached to the voice coil and to the panel; and
wherein the inner magnet is axially magnetized and the outer magnet is radially magnetized, and during operation of the device electrical activation of the voice coil causes axial motion of the actuator coupling plate; and
wherein the device is a panel audio loudspeaker.

2. The device of claim 1, wherein the inner and outer magnets are symmetric with respect to axial rotations.

3. The device of claim 1, wherein the outer magnet is formed from a plurality of segments of a magnetic material.

4. The device of claim 1, further comprising a top plate comprising the soft magnetic material on an opposite side of the inner magnet from the yoke base.

5. The device of claim 4, wherein the top plate has the same radial dimensions as the inner magnet.

6. The device of claim 4, wherein the top plate has larger radial dimensions than the inner magnet.

7. The device of claim 1, wherein the device has a maximum dimension in the axial direction of 10 mm or less.

8. The device of claim 1, wherein the panel comprises a touch panel.

9. The device of claim 1, wherein the device is configured to generate audio and/or haptic responses.

10. A mobile device, comprising the device of claim 1.

11. The mobile device of claim 10, wherein the mobile device is a mobile phone or a tablet computer.

12. The mobile device of claim 10, wherein the mobile device is a wearable device.

13. A mobile device or a wearable device, comprising:
a housing;
a display panel mounted in the housing;
an actuator coupling plate attached to the display panel;
a voice coil attached to the actuator coupling plate, the voice coil defining an axis;
an inner magnet arranged relative to the axis;
an outer magnet arranged a radial distance from the axis, an inner radial wall of the outer magnet facing an outer radial wall of the inner magnet, the inner and outer radial walls being separated by an air gap,
a cup comprising a base and a side defining a cup cavity, the base and side comprising a soft magnetic material, the inner and outer magnets being arranged in the cup cavity;
wherein the voice coil is arranged in the air gap separating the inner and outer magnets, the inner magnet is axially magnetized and the outer magnet is radially magnetized; and
an electronic control module electrically coupled to the voice coil and programmed to energize the voice coil to cause axial motion of the inner magnet relative to the voice coil such that the display panel vibrates at frequencies and amplitudes sufficient to produce an audio response from the display panel.

* * * * *